(12) United States Patent
Lindner et al.

(10) Patent No.: US 8,663,588 B2
(45) Date of Patent: *Mar. 4, 2014

(54) THREE WAY CATALYST

(75) Inventors: Dieter Lindner, Hanau (DE); Martin Roesch, Rodgau (DE); Raoul Klingmann, Broken Arrow, OK (US); Anke Wolf, Rio de Janeiro (BR); Joerg-Michael Richter, Frankfurt a.M. (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 869 days.

This patent is subject to a terminal disclaimer.

(21) Appl. No.: 12/305,830

(22) PCT Filed: Jun. 27, 2007

(86) PCT No.: PCT/EP2007/005661
§ 371 (c)(1),
(2), (4) Date: Jun. 7, 2010

(87) PCT Pub. No.: WO2008/000449
PCT Pub. Date: Jan. 3, 2008

(65) Prior Publication Data
US 2010/0263357 A1    Oct. 21, 2010

(30) Foreign Application Priority Data
Jun. 29, 2006 (EP) .................... 06013413

(51) Int. Cl.
| | | |
|---|---|---|
| *B01D 53/56* | (2006.01) | |
| *B01D 53/94* | (2006.01) | |
| *B01J 8/02* | (2006.01) | |
| *F01N 3/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01J 23/00* | (2006.01) | |
| *B01J 21/00* | (2006.01) | |

(52) U.S. Cl.
USPC .......... 423/213.5; 60/299; 502/302; 502/303; 502/304; 502/324; 502/327; 502/328; 502/332; 502/333; 502/334; 502/339; 502/349; 502/355; 502/415; 502/439; 502/527.12; 502/527.13

(58) Field of Classification Search
USPC ......... 502/302–304, 324, 327, 328, 332–334, 502/339, 349, 355, 415, 439, 527.12, 502/527.13; 422/170–180; 60/299; 423/213.5
See application file for complete search history.

(56) References Cited

U.S. PATENT DOCUMENTS

| | | | | |
|---|---|---|---|---|
| 4,153,579 | A * | 5/1979 | Summers et al. | 502/304 |
| 5,179,059 | A | 1/1993 | Domesle et al. | |
| 5,407,880 | A * | 4/1995 | Ikeda et al. | 502/67 |
| 5,593,647 | A * | 1/1997 | Kirby | 422/180 |
| 5,597,771 | A * | 1/1997 | Hu et al. | 502/304 |
| 6,022,825 | A * | 2/2000 | Andersen et al. | 502/303 |
| 6,080,375 | A * | 6/2000 | Mussmann et al. | 423/213.5 |
| 6,087,298 | A * | 7/2000 | Sung et al. | 502/333 |
| 6,103,660 | A | 8/2000 | Yperen et al. | |
| 6,150,288 | A * | 11/2000 | Suzuki et al. | 501/105 |
| 6,182,443 | B1 * | 2/2001 | Jarvis et al. | 60/274 |
| 6,261,989 | B1 * | 7/2001 | Tanaka et al. | 502/217 |
| 6,294,140 | B1 * | 9/2001 | Mussmann et al. | 423/213.5 |
| 6,306,794 | B1 * | 10/2001 | Suzuki et al. | 502/304 |
| 6,348,430 | B1 * | 2/2002 | Lindner et al. | 502/304 |
| 6,375,910 | B1 * | 4/2002 | Deeba et al. | 423/239.1 |
| 6,413,483 | B1 * | 7/2002 | Brisley et al. | 423/239.1 |
| 6,432,859 | B1 * | 8/2002 | Iwakuni et al. | 502/66 |
| 6,514,905 | B1 * | 2/2003 | Hanaki et al. | 502/328 |
| 6,645,439 | B2 * | 11/2003 | Zhang et al. | 422/177 |
| 6,764,665 | B2 * | 7/2004 | Deeba et al. | 423/239.1 |
| 6,808,687 | B1 | 10/2004 | Uenishi et al. | |
| 6,916,450 | B2 * | 7/2005 | Akama et al. | 422/180 |
| 6,967,186 | B2 * | 11/2005 | Takaya et al. | 502/325 |

| | | | | | | | |
|---|---|---|---|---|---|---|---|
| 7,022,646 | B2* | 4/2006 | Li ............................... 502/339 | EP | 1 046 423 A2 | 10/2000 | |
| 7,081,430 | B2* | 7/2006 | Uenishi et al. ................ 502/327 | EP | 1 300 193 A1 | 4/2003 | |
| 7,189,375 | B2* | 3/2007 | Molinier et al. .............. 422/171 | EP | 1 669 135 A1 | 6/2006 | |
| 7,204,965 | B2* | 4/2007 | Okawara et al. .............. 422/177 | EP | 1704910 A2 | 9/2006 | |
| 7,214,331 | B2* | 5/2007 | Jiang et al. ..................... 252/373 | EP | 1 726 359 A1 | 11/2006 | |
| 7,229,597 | B2* | 6/2007 | Patchett et al. ............... 422/177 | EP | 1 979 809 A1 | 10/2008 | |
| 7,306,771 | B2* | 12/2007 | Okawara ....................... 422/177 | JP | 2006-263583 A | 10/2006 | |
| 7,329,629 | B2* | 2/2008 | Gandhi et al. ................. 502/325 | JP | 2006-326527 A | 12/2006 | |
| 7,384,612 | B2* | 6/2008 | Ajisaka et al. ................. 422/177 | WO | 00/29726 | 5/2000 | |
| 7,431,749 | B2* | 10/2008 | Kim et al. ......................... 55/523 | WO | 02/26379 A1 | 4/2002 | |
| 7,517,510 | B2* | 4/2009 | Chen et al. .................. 423/213.2 | | | | |
| 7,550,124 | B2* | 6/2009 | Chen et al. .................. 423/213.2 | | | | |
| 7,576,031 | B2* | 8/2009 | Beutel et al. .................. 502/339 | | | | |
| 7,611,680 | B2* | 11/2009 | Jia et al. ......................... 422/177 | | | | |
| 7,622,096 | B2* | 11/2009 | Deeba et al. ............... 423/213.2 | | | | |
| 7,625,529 | B2* | 12/2009 | Ohno et al. .................... 422/180 | | | | |
| 7,638,460 | B2* | 12/2009 | Nakamura et al. ............ 502/326 | | | | |
| 7,673,448 | B2* | 3/2010 | Voss et al. ........................ 60/297 | | | | |
| 7,678,347 | B2* | 3/2010 | Chen ............................. 422/180 | | | | |
| 7,704,473 | B2* | 4/2010 | Ikeda et al. ................. 423/213.2 | | | | |
| 7,709,414 | B2* | 5/2010 | Fujdala et al. ................ 502/326 | | | | |
| 7,722,829 | B2* | 5/2010 | Punke et al. .................. 422/180 | | | | |
| 7,737,077 | B2* | 6/2010 | Kitamura et al. ............. 502/326 | | | | |
| 7,740,809 | B2* | 6/2010 | Suwabe et al. ................ 422/180 | | | | |
| 7,749,472 | B2* | 7/2010 | Chen et al. .................. 423/213.2 | | | | |
| 7,795,172 | B2* | 9/2010 | Foong et al. ................... 502/327 | | | | |
| 7,875,250 | B2* | 1/2011 | Nunan ........................... 422/177 | | | | |
| 7,919,051 | B2* | 4/2011 | Li et al. ......................... 422/171 | | | | |
| 7,923,408 | B2* | 4/2011 | Takahashi et al. ............ 502/327 | | | | |
| 7,951,338 | B2* | 5/2011 | Miyairi et al. ................. 422/177 | | | | |
| 8,007,750 | B2* | 8/2011 | Chen et al. .................. 423/239.1 | | | | |
| 8,119,075 | B2* | 2/2012 | Dettling et al. ............... 422/180 | | | | |
| 2004/0198595 | A1* | 10/2004 | Chen ............................. 502/328 | | | | |
| 2005/0164879 | A1* | 7/2005 | Chen ............................. 502/328 | | | | |
| 2005/0186154 | A1 | 8/2005 | Bonda et al. | | | | |
| 2006/0057046 | A1 | 3/2006 | Punke | | | | |
| 2006/0128562 | A1 | 6/2006 | Miyoshi et al. | | | | |
| 2006/0133969 | A1 | 6/2006 | Chiffey | | | | |
| 2006/0217263 | A1 | 9/2006 | Kawamoto | | | | |
| 2006/0270549 | A1 | 11/2006 | Sato et al. | | | | |
| 2007/0155624 | A1* | 7/2007 | Wakita et al. ................. 502/304 | | | | |
| 2007/0269353 | A1* | 11/2007 | Li et al. ......................... 422/176 | | | | |
| 2008/0120970 | A1* | 5/2008 | Hilgendorff et al. ............ 60/299 | | | | |
| 2009/0285736 | A1 | 11/2009 | Schsfer-Sindlinger et al. | | | | |
| 2010/0275579 | A1 | 11/2010 | Klingmann et al. | | | | |

FOREIGN PATENT DOCUMENTS

| | | |
|---|---|---|
| CA | 2 271 818 | 11/1999 |
| DE | 100 24 994 A1 | 1/2001 |
| EP | 0 441 173 A1 | 8/1991 |
| EP | 957064 A1 | 8/1997 |
| EP | 0 885 650 A2 | 12/1998 |

OTHER PUBLICATIONS

International Preliminary Report on Patentability/Written Opinion issued in corresponding International Application No. PCT/EP2007/005661 filed on Jun. 27, 2007.

PCT Notification of Transmittal of Translation of International Preliminary Report on Patentability (Form PCT/IB/338) for International Appl. No. PCT/EP2008/003015 dated Jun. 10, 2010.

PCT International Preliminary Report on Patentability (Form PCT/IB/373) for International Appl. No. PCT/EP2008/003015 dated Jun. 1, 2010.

PCT Written Opinion of the International Searching Authority (Form PCT/ISA/237) for International Appl. No. PCT/EP2008/003015 dated May 28, 2010.

* cited by examiner

*Primary Examiner* — Cam N. Nguyen

(74) *Attorney, Agent, or Firm* — Suzannah K. Sundby, Esq.; Smith, Gambrell & Russell, LLP

(57) ABSTRACT

A double-layer three-way catalyst for purification of the exhaust gases from internal combustion engines which has excellent activity and thermal stability is described. The catalyst contains active aluminum oxide and a first cerium/zirconium mixed oxide which are both catalytically activated with palladium in the first layer applied to a catalyst support. In the second layer which is in direct contact with the exhaust gas, the catalyst likewise contains an active aluminum oxide and a second cerium/zirconium mixed oxide which are both catalytically activated with rhodium. The second cerium/zirconium mixed oxide has a higher zirconium oxide content than the first mixed oxide.

8 Claims, 2 Drawing Sheets

THREE WAY CATALYST

INTRODUCTION AND BACKGROUND

The invention relates to a three-way catalyst having excellent catalytic activity and aging stability for the purification of exhaust gases from internal combustion engines.

Three-way catalysts are used in large numbers for the purification of exhaust gases from internal combustion engines operated essentially stoichiometrically. They are able to convert the three significant pollutants from the engine, namely hydrocarbons, carbon monoxide and nitrogen oxides, simultaneously into nonpolluting components. Double-layer catalysts which allow a separation of various catalytic processes and thus optimal matching of the catalytic activities in the two layers are frequently used. Catalysts of this type are described, for example, in EP 0 885 650 and EP 1 046 423.

The continually increasing requirements for reducing emissions from internal combustion engines make continual further development of the catalysts necessary. The light-off temperatures of the catalyst for conversion of the pollutants and its thermal stability are of particular importance. The light-off temperature for a pollutant indicates the temperature at which more than, for example, 50% of this pollutant is converted. The lower these temperatures, the earlier after a cold start can the pollutants be converted. At full load, exhaust gas temperatures of up to 1150° C. can occur directly at the outlet from the engine. The better the thermal stability of the catalyst, the closer to the engine can it be located. This likewise improves exhaust gas purification after a cold start.

The catalysts as described in EP 0 885 650 and EP 1 046 423 have very good properties in respect of light-off temperatures and thermal stability. However, the increased legal obligations make it necessary to seek even better catalysts. It was therefore an object of the present invention to provide a catalyst which has further decreased light-off temperatures and improved thermal stability compared to the catalysts of the prior art.

SUMMARY OF THE INVENTION

This object is achieved by a catalyst according to the claims. The catalyst has two superposed catalytically active coatings on an inert catalyst support composed of ceramic or metal. The catalyst is characterized in that the two layers each contain an active aluminium oxide and a cerium/zirconium mixed oxide and the two oxide materials of the first layer are catalytically activated by means of palladium and the two oxide materials of the second layer are catalytically activated by means of rhodium, with the cerium/zirconium mixed oxide of the second layer having a higher zirconium oxide content than the cerium/zirconium mixed oxide of the first layer.

For the purposes of the present invention, the expression "first layer" in each case refers to the layer which is applied directly to the honeycomb body. The second layer is deposited on the first layer and is in direct contact with the exhaust gas to be purified.

It has surprisingly been found that significant improvements in respect of light-off behaviour and thermal stability can be achieved by the combination of the properties mentioned.

The active aluminium oxide and the cerium-zirconium mixed oxides of the first and second layers are introduced as pulverulent solids into the coatings and palladium or rhodium are deposited both on the aluminium oxide and on the cerium/zirconium mixed oxide of the respective layer. Furthermore, the cerium/zirconium mixed oxide of the second layer has a higher zirconium oxide content than the cerium/zirconium mixed oxide of the first layer.

Both mixed oxides can be stabilized with at least one oxide of the elements selected from the group consisting of iron, manganese, tin, titanium, silicon, yttrium, lanthanum, praseodymium, neodymium, samarium and mixtures thereof in order to improve their thermal stability. The amount of the doping elements, calculated as oxide, is preferably from 1 to 15% by weight, in particular from 5 to 10% by weight, based on the total weight of the stabilized mixed oxide.

The first cerium/zirconium mixed oxide preferably has a weight ratio of cerium oxide to zirconium oxide of from 0.8 to 1.2 and the second cerium/zirconium mixed oxide has a weight ratio of cerium oxide to zirconium oxide of from 0.5 to 0.1. The specific surface area of these materials is advantageously in the range from 50 to 100 $m^2/g$.

The active aluminium oxide of the first and second layers is preferably also stabilized by doping with from 1 to 10% by weight of lanthanum oxide, based on the total weight of the aluminium oxide. A further improvement in the thermal stability of the catalyst can be achieved by additionally impregnating active aluminium oxide and cerium/zirconium mixed oxide of the first layer with strontium oxide and/or barium oxide.

The catalyst support is usually a honeycomb body which has a volume V and has parallel flow channels for the exhaust gases from the internal combustion engine, with the walls of the flow channels being coated with the two catalyst layers and the concentration of palladium in the first layer based on the volume of the honeycomb body being from 0.1 to 10 g and the concentration of rhodium in the second layer being from 0.01 to 1 g.

In a particular embodiment of the catalyst, the active aluminium oxide and the second cerium/zirconium mixed oxide in the second layer can be catalytically activated with platinum in addition to rhodium, with the concentration of platinum based on the volume of the honeycomb body being from 0.01 to 1 g.

The noble metal concentrations which are actually to be used depend on the desired pollutant conversions. The highest concentration values given here are necessary for meeting the strict exhaust gas standards for SULEV vehicles (Super Ultra-Low Emission Vehicles).

To coat the catalyst support with the two catalytically active layers, the solids provided for the respective layer are suspended in, for example, water. In the case of the first layer, the solids are the active aluminium oxide and the first cerium/zirconium mixed oxide. Palladium is precipitated onto these materials from, preferably, palladium nitrate by the process described in U.S. Pat. No. 6,103,660 using barium hydroxide or strontium hydroxide as base. The catalyst support can immediately be coated with the suspension obtained in this way. The applied layer is subsequently dried and, if appropriate, calcined. The second coating is then applied. For this purpose, active aluminium oxide and the second cerium/zirconium mixed oxide are once again suspended in water and rhodium is precipitated onto them by introduction of rhodium nitrate.

As a result of the use of barium hydroxide or strontium hydroxide as base for the precipitation of palladium nitrate, barium oxide or strontium oxide remain in the first coating after the final calcination.

As an alternative to the procedure described, the noble metals can also be deposited separately on each solid component of the catalyst. Only then are, for example, palladium-activated aluminium oxide and palladium-activated cerium/ zirconium mixed oxide suspended together in water and applied to the catalyst support. This procedure makes it possible to set the concentration of the catalytically active noble metals on aluminium oxide and the concentration of catalytically active noble metals on cerium/zirconium mixed oxides in a targeted manner. The process described in EP 957064 is preferably used for the separate deposition of the noble metals on aluminium oxide and cerium/zirconium mixed oxide.

BRIEF DESCRIPTION OF DRAWINGS

The invention is illustrated below with the aid of the examples and the figures. The figures show.

DETAILED EMBODIMENTS OF INVENTION

EXAMPLE 1

Figure 1:
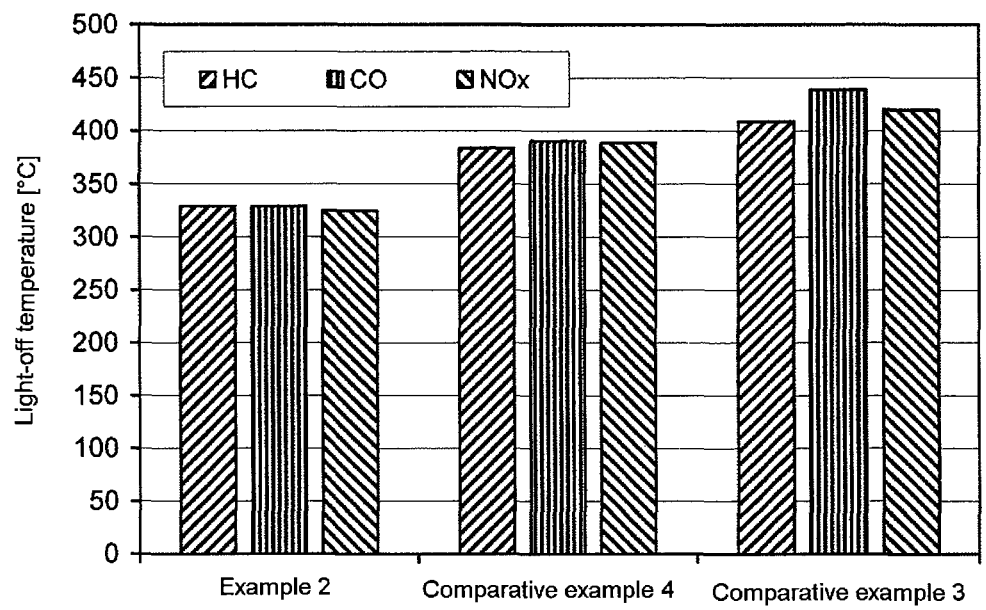
FIG. 1: Comparison of the light-off temperatures of the catalyst according to the invention with a catalyst from the prior art.

Two catalysts according to the invention were produced by coating cordierite honeycomb bodies. The honeycomb bodies had a cell density of 93 cm$^{-2}$, a diameter of 10.16 cm and a length of 15.24 cm. Their cell walls had a thickness of 0.11 mm.

The honeycomb bodies were each coated in succession with two different coating suspensions.

Production of the First Layer:

Aluminium oxide stabilized with 3% by weight of lanthanum oxide (specific surface area: 140 m$^2$/g) and a first cerium/zirconium mixed oxide having a zirconium oxide content of 50% by weight were activated together with palladium starting from palladium nitrate as described in U.S. Pat. No. 6,103,660 using strontium hydroxide as base. The resulting suspension was used directly for coating of the honeycomb bodies. After coating, the honeycomb bodies were dried and calcined. The finished first layer contained the following amounts of coating constituents:

80 g/l of lanthanum-stabilized aluminium oxide
55 g/l of first cerium/zirconium mixed oxide
10 g/l of strontium oxide (on all components)
0.88 g/l of palladium (on all components)

Production of the Second Layer:

Aluminium oxide stabilized with lanthanum oxide and a second cerium/zirconium mixed oxide having a zirconium oxide content of 70% by weight were suspended in water. An aqueous solution of rhodium nitrate was then introduced into the suspension with continual stirring and the honeycomb bodies which had been provided with the first layer were coated with the second coating suspension, dried and calcined. The finished second layer contained the following amounts of coating constituents:

70 g/l of lanthanum-stabilized aluminium oxide
65 g/l of second cerium/zirconium mixed oxide
0.25 g/l of rhodium (on all components)

The total noble metal loading of the catalyst was 1.13 g/l with a weight ratio of palladium to rhodium of 25:7.

COMPARATIVE EXAMPLE 1

A comparative catalyst on a honeycomb body was produced as in the above example.

In a change from example 1, the first cerium/zirconium mixed oxide in the first layer was replaced by pure cerium oxide and the rhodium in the second layer was deposited selectively only on the stabilized aluminium oxide.

COMPARATIVE EXAMPLE 2

A further comparative catalyst on a honeycomb body was produced as in the example. In a change from comparative example 1, a cerium/zirconium mixed oxide having a zirconium oxide content of 50% by weight was used in both layers.

Testing of the Catalysts

The light-off temperatures of the catalysts of Example 1 and Comparative Examples 1 and 2 were measured on an engine test bed. The catalyst of Example 1 had a light-off temperature for all pollutants which was from 20 to 30° C. lower than that of the catalysts of Comparative Examples 1 and 2.

EXAMPLE 2

Two further catalysts according to the invention were produced in a manner analogous to Example 1. As a change from Example 1, a cerium/zirconium mixed oxide which had a zirconium oxide content of 50% by weight and had additionally been stabilized with 10% by weight of lanthanum oxide and yttrium oxide, where the percentages are based in each case on the total weight of the stabilized mixed oxide, was used in the first layer.

To produce the second layer, a cerium/zirconium mixed oxide which had a zirconium oxide content of 72% by weight and was stabilized with 7% by weight of lanthanum oxide and neodymium oxide was used, as a change to Example 1.

The total noble metal loading of the catalyst was 1.13 g/l with a weight ratio of palladium to rhodium of 25:7.

COMPARATIVE EXAMPLE 3

A comparative catalyst on an identical honeycomb body as in the above example was produced as described in Example 1 of EP 0 885 650 B1.

Production of the First Layer:

Lanthanum-stabilized aluminium oxide (3% by weight of lanthanum oxide, specific surface area of the stabilized material: 140 m$^2$/g) and cerium oxide were suspended in water. The honeycomb bodies were coated by dipping in this suspension. After coating, the honeycomb body was dried and calcined. The coating was subsequently impregnated with a joint solution of palladium nitrate and barium acetate, dried again and calcined. The finished first layer contained the following amounts of coating constituents:

120 g/l of lanthanum-stabilized aluminium oxide
80 g/l of cerium oxide
15 g/l of barium oxide (on all components)
0.88 g/l of palladium (on all components)

Production of the Second Layer:

Aluminium oxide stabilized with lanthanum oxide was coated with 2.4% by weight of rhodium, based on the aluminium oxide used. For this purpose, the stabilized aluminium oxide was suspended in water. A solution of rhodium nitrate was added to this suspension and rhodium was thereby deposited on the aluminium oxide. Only then were a cerium/zirconium mixed oxide containing 70% by weight of cerium oxide and pure aluminium oxide added to the suspension so that they remained free of a rhodium coating.

The honeycomb body was coated a second time using this coating dispersion, dried and calcined. The second layer contained the following amounts of coating constituents:
- 10 g/l of lanthanum-stabilized aluminium oxide
- 20 g/l of cerium/zirconium mixed oxide
- 20 g/l of aluminium oxide+0.25 g/l of rhodium

COMPARATIVE EXAMPLE 4

A further comparative catalyst containing a cerium/zirconium mixed oxide containing 50% by weight of zirconium oxide in both layers was produced. In the second layer, rhodium was deposited only on aluminium oxide. The catalyst had the following composition:

1st layer
- 95 g/l of lanthanum-stabilized aluminium oxide
- 45 g/l of cerium/zirconium mixed oxide (50% by weight of zirconium oxide)
- 15 g/l of barium oxide (on all components)
- 0.88 g/l of palladium (on all components)

2nd layer
- 50 g/l of cerium/zirconium mixed oxide (50% by weight of zirconium oxide)
- 75 g/l of lanthanum-stabilized aluminium oxide+0.25 g/l of rhodium Testing of the Catalysts Before testing, all catalysts were subjected to aging for 38 hours on an engine by overrun fuel cutoff. The temperature upstream of the catalysts during this aging was 950° C.

After aging, a catalyst as per Example 2 and the catalysts from Comparative Examples 3 and 4 were tested in respect of light-off temperatures and their CO/NOx crossing points on an engine test bed.

FIG. 1 shows the comparison of the light-off temperatures. The catalyst according to the invention from Example 2 has significantly lower light-off temperatures after aging than the catalysts from Comparative Examples 3 and 4.

Figure 2:
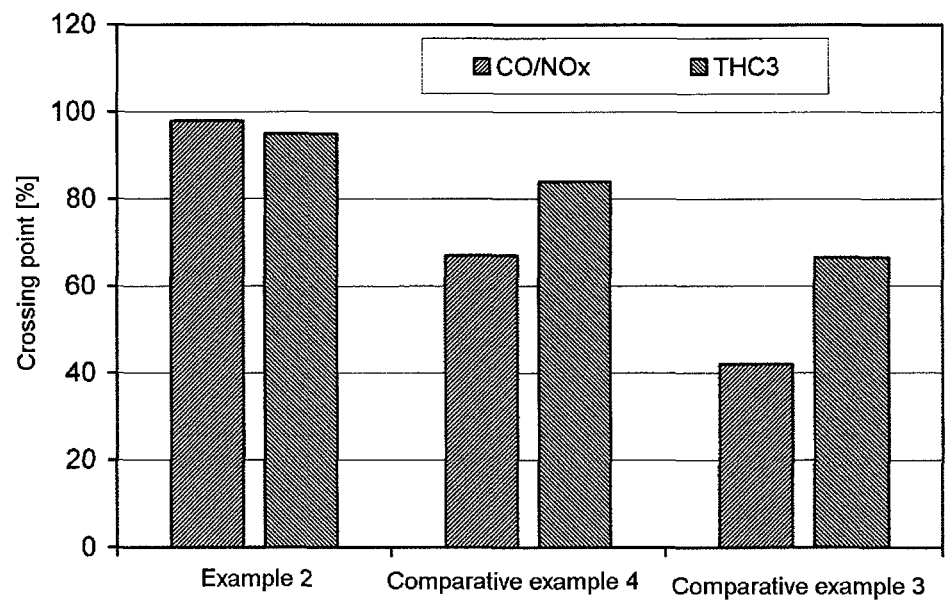
FIG. 2: CO/NOx crossing points (lambda intercept) at 400° C.

The measurement in FIG. 2 shows similarly good performance advantages of the catalyst according to the invention over the comparative catalysts. In FIG. 2, the hydrocarbon emissions, calculated as propane, measured at the CO/NOx crossing points are denoted by THC3. The advantages of the catalyst according to the invention can be attributed to the combination of the features according to the invention, namely noble metal positioning and use of two cerium/zirconium mixed oxides having different zirconium oxide contents, with the cerium/zirconium mixed oxide in the second layer having a higher zirconium oxide content than that of the first layer.

Figure 3:
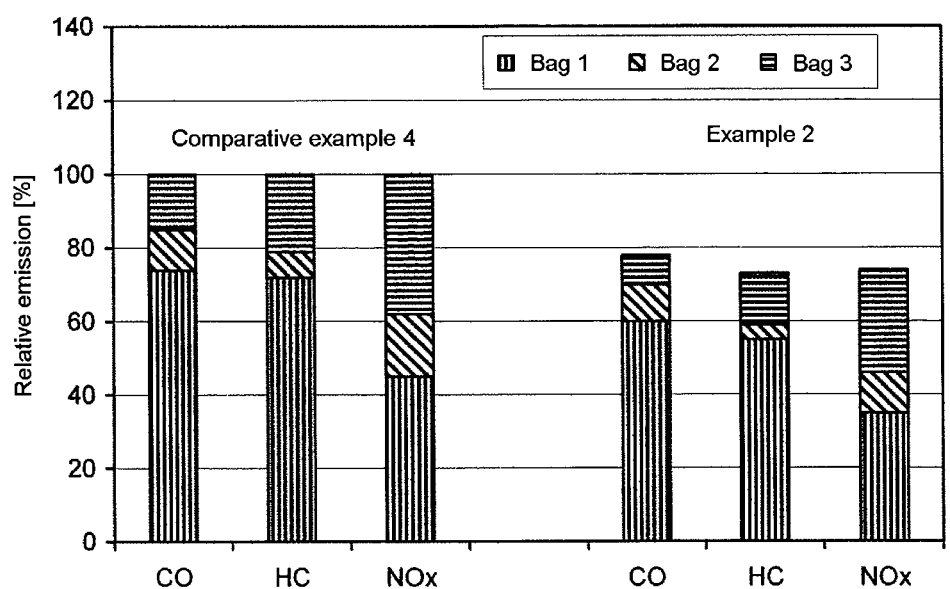
FIG. 3: Relative emissions in the FTP75 test

The second catalyst of Example 2 and the catalyst of Comparative Example 4 were tested in respect of their emissions in the FTP75 test on a vehicle. FIG. 3 shows the measured emission values relative to one another, with the emissions of the catalyst from the comparative example being set to 100. In this test, too, the catalyst according to the invention displays better values than the catalyst of Comparative Example 4.

The measurements presented demonstrate excellent aging stability of the catalysts according to the invention. They can therefore be used not only in the underbody region of a motor vehicle but can also be used as primary catalysts close to the engine.

The invention claimed is:

1. A double-layer three-way catalyst on an inert catalyst support composed of ceramic or metal for purification of the exhaust gases from internal combustion engines, comprising a first layer and a second layer forming two layers on said inert catalyst support, each of said first and said second layers containing two oxide materials which are an active aluminum oxide and a cerium/zirconium mixed oxide and the two oxide materials of the first layer are catalytically activated by means of palladium and the two oxide materials of the second layer are catalytically activated by means of rhodium, with the cerium/zirconium mixed oxide of the second layer having a higher zirconium oxide content than the cerium/zirconium mixed oxide of the first layer, wherein the first layer is applied on the inert catalyst support and the second layer is applied on the first layer.

2. The double-layer three-way catalyst according to claim 1, wherein the active aluminum oxide and cerium/zirconium mixed oxide of the first layer is impregnated with strontium oxide or barium oxide.

3. The double-layer three-way catalyst according to claim 1, wherein the cerium/zirconium mixed oxides of the two layers are each stabilized with from 1 to 15% by weight of oxides, based on the total weight of the mixed oxides, with the oxides each being selected from the group consisting of iron, manganese, tin, titanium, silicon, yttrium, lanthanum, praseodymium, neodymium, sarmarium and mixtures thereof.

4. The double-layer three-way catalyst according to claim 3, wherein the cerium/zirconium mixed oxide of the first layer has a weight ratio of cerium oxide to zirconium oxide of from 0.8 to 1.2 and the cerium/zirconium mixed oxide of the second layer has a weight ratio of cerium oxide to zirconium oxide of from 0.5 to 0.1.

5. The double-layer three-way catalyst according to claim 4, wherein the active aluminum oxide of the first and second layers is in each case stabilized with from 1 to 10% by weight of lanthanum oxide, based on the total weight of the aluminum oxide.

6. The double-layer three-way catalyst according to claim 1, wherein the catalyst support is a honeycomb body which has a volume V and has parallel flow channels for the exhaust gases from an internal combustion engine, with the walls of the flow channels being coated with the two catalyst layers and the concentration of palladium in the first layer based on the volume of the honeycomb body being from 0.1 to 10 g and the concentration of rhodium in the second layer being from 0.01 to 1 g.

7. The double-layer three-way catalyst according to claim 6, wherein, in the second layer, the active aluminum oxide and the cerium/zirconium mixed oxide are catalytically activated with platinum in addition to rhodium and the concentration of platinum based on the volume of the honeycomb body is from 0.01 to 1 g.

8. A process for purifying exhaust gases from an engine comprising passing said exhaust gas in contact with the double-layer three-way catalyst according to claim 1 as primary catalyst close to the engine or as main catalyst in an underbody region of a motor vehicle equipped with a petrol engine for purifying the exhaust gases from the engine.

* * * * *